(12) United States Patent
Salgues

(10) Patent No.: US 11,651,187 B2
(45) Date of Patent: May 16, 2023

(54) REUSABLE SEAL AND VEHICLE COMPRISING A REUSABLE SEAL

(71) Applicant: Airbus SAS, Blagnac (FR)

(72) Inventor: Benoit Salgues, Toulouse (FR)

(73) Assignee: AIRBUS SAS, Blagnac (FR)

( * ) Notice: Subject to any disclaimer, the term of this patent is extended or adjusted under 35 U.S.C. 154(b) by 358 days.

(21) Appl. No.: 16/832,486

(22) Filed: Mar. 27, 2020

(65) Prior Publication Data

US 2020/0320362 A1 Oct. 8, 2020

(30) Foreign Application Priority Data

Apr. 8, 2019 (FR) ...................................... 1903724

(51) Int. Cl.
| | |
|---|---|
| *G01D 5/24* | (2006.01) |
| *G06K 19/077* | (2006.01) |
| *G06K 7/10* | (2006.01) |
| *B64F 5/60* | (2017.01) |
| *H02J 50/00* | (2016.01) |

(52) U.S. Cl.
CPC ......... *G06K 19/07798* (2013.01); *G01D 5/24* (2013.01); *G06K 7/10366* (2013.01); *G06K 19/07773* (2013.01); *B64F 5/60* (2017.01); *H02J 50/001* (2020.01)

(58) Field of Classification Search
CPC ......... G06K 19/07773; G06K 7/10366; G06K 19/0716; G06K 19/07798; G01D 5/24; B64F 5/60; H02J 50/001
See application file for complete search history.

(56) References Cited

U.S. PATENT DOCUMENTS

| 10,074,247 B1 * | 9/2018 | Tang | ................. G08B 21/0275 |
| 2002/0175873 A1 * | 11/2002 | King | ....................... H01Q 9/04 |
| | | | 343/718 |
| 2004/0233054 A1 | 11/2004 | Neff et al. | |

(Continued)

FOREIGN PATENT DOCUMENTS

| CN | 106599975 A | * 4/2017 |
| JP | 2016177511 A | * 10/2016 |

(Continued)

OTHER PUBLICATIONS

French Search Report; priority document.

*Primary Examiner* — Sonji N Johnson
(74) *Attorney, Agent, or Firm* — Greer, Burns & Crain, Ltd.

(57) ABSTRACT

A reusable seal including an antenna, an opening sensor to sense the opening of a volume to be monitored and an electronic device coupled to the antenna and configured to communicate with a reader via the antenna. The electronic device is supplied with power only by the antenna when a reader is proximate to the antenna. The seal has a memory that may assume an active state or an inactive state. The seal is configured such that the memory may be activated only by the electronic device when the device is supplied with power to store an intact seal state in the memory, and the memory may be deactivated at any time when the opening sensor is actuated to store a non-intact seal state in the memory. The seal is configured to respond to a request from a reader regarding its state according to the memory state.

8 Claims, 2 Drawing Sheets

(56) References Cited

U.S. PATENT DOCUMENTS

2007/0069895 A1\* 3/2007 Koh .................. G08B 13/2417
                                                    340/572.1
2008/0245791 A1   10/2008 Atherton
2020/0210801 A1\* 7/2020 Oda ................ G06K 19/07756

FOREIGN PATENT DOCUMENTS

JP      2016177511 A    10/2016
WO       0207084 A1     1/2002

\* cited by examiner

REUSABLE SEAL AND VEHICLE COMPRISING A REUSABLE SEAL

CROSS-REFERENCES TO RELATED APPLICATIONS

This application claims the benefit of the French patent application No. 1903724 filed on Apr. 8, 2019, the entire disclosures of which are incorporated herein by way of reference.

BACKGROUND OF THE INVENTION

The invention relates to the field of monitoring a volume with access restricted by means of a seal. More particularly, the invention relates to a reusable seal that allows such a volume to be monitored, and to a vehicle comprising such a seal. It is sometimes necessary to monitor a volume with restricted access in order to ascertain whether someone has been able to access this volume despite it being forbidden.

BACKGROUND OF THE INVENTION

It is known practice to affix a seal comprising a wire that connects a frame and a leaf of a door, this wire being held in place on the frame and on the leaf by wax. Any attempt to open the door will result in the wax being broken or becoming detached from the frame or from the leaf. In this way it is possible to ascertain whether someone has attempted to open the door. However, to monitor the state of the seal, it is necessary for someone to go and look at the seal to check its state. Moreover, once the door has been opened, the seal has been broken and it cannot be reused.

The use of an electronic seal may allow it to be monitored remotely. However, such an electronic seal requires a power supply to operate. For installation-related practical reasons, in particular on board a vehicle such as an aircraft, it is desirable for such a seal not to require connection to a power distribution network, which would entail addition weight and bulk due to the necessary cabling. Moreover, the use of batteries on board an aircraft is regulated and it is desirable for an electronic seal not to require the use of batteries. One solution could consist in using a passive electronic seal communicating by means of a radiofrequency technology, for example RFID, in which the seal would be supplied with power by a reader when being read. However, between two reads, the seal would not be supplied with power. As result, it would not be able to continually monitor a sensor for sensing access to the volume to be monitored. For the monitoring of the volume to be monitored to be effective, it would then be necessary to use a sensor whose state would be irreversibly modified by the opening of the volume to be monitored (for example a sensor having a portion which would be destroyed when the volume to be monitored is opened). Consequently, with the sensor, and potentially even the electronic seal, having been destroyed in this way, it would then not be able to be reused. However, it would be desirable to have a seal that is easily reusable after detection of the volume to be monitored being opened, so as to facilitate maintenance.

SUMMARY OF THE INVENTION

A particular aim of the present invention is to provide a solution to this problem. The invention relates to a reusable seal comprising:
an antenna;
an opening sensor for sensing the opening of a volume to be monitored by the seal; and
an electronic device that is coupled to the antenna and configured to communicate with a reader via the antenna when the reader is placed in proximity to the antenna,
the electronic device being connected to the opening sensor, and
the electronic device being supplied with power only by the antenna when a reader is placed in proximity to the antenna.

The seal is noteworthy in that:
the seal comprises a memory that may assume an active state or an inactive state,
the seal is configured such that:
the memory may be activated only by the electronic device when the device is supplied with power by the reader and receives a memory activation command from the reader so as to store an intact state of the seal in the memory; and
the memory may be deactivated at any time when the opening sensor is actuated, without requiring the electronic device to be supplied with power, so as to store a non-intact state of the seal in the memory,
and in that the electronic device is configured to respond to a request from a reader regarding the state of the seal by providing information corresponding to an intact state of the seal when the memory is activated and by providing information corresponding to a non-intact state of the seal when the memory is deactivated.

Thus, an intact state of the seal is stored in the memory, by the memory being activated by the electronic device, only when the device is supplied with power by a reader positioned in proximity to the antenna. In the event of an attempt to access a volume protected by the seal, the access attempt would result in the opening sensor of the seal being actuated and consequently the memory would be deactivated. The memory may be deactivated at any time. Thus, it is possible to detect and to store the opening of the seal even if the electronic device is not supplied with power. It is thus not necessary to use a battery or electrical cabling to keep the electronic device continuously supplied with power. Furthermore, after the memory has been deactivated when the volume to be monitored by the seal is opened, the memory may be reactivated by the electronic device, which allows the seal to be reused indefinitely.

More particularly, the seal is configured such that the deactivation of the memory when the volume to be monitored is opened is performed by the action of an electrical circuit in relation to the sensor without requiring the electronic device to be supplied with power or the electrical circuit to be supplied with power.

In one particular embodiment, the antenna and the electronic device form part of an RFID device.

In one embodiment, the memory comprises a capacitor that may assume a charged state or a discharged state such that a charged state of the capacitor corresponds to an activated state of the memory and a discharged state of the capacitor corresponds to a deactivated state of the memory.

In particular, the seal comprises a diode on a connection between the capacitor and the opening sensor so as to prevent the capacitor from being charged via the connection.

In one particular variant, the memory is incorporated within the electronic device. Advantageously, the capacitor is incorporated within an EEPROM cell of the electronic device.

In a second variant, the memory is external to the electronic device.

In particular, the opening sensor is such that it corresponds to an open circuit when the seal is in an intact state and it corresponds to a closed circuit when the seal is in a non-intact state.

The invention also relates to a vehicle comprising:
a reusable seal such as above; and
a reader for communicating with the seal,
the opening sensor being arranged so as to allow a volume of the vehicle with restricted access to be monitored.

BRIEF DESCRIPTION OF THE DRAWINGS

The invention will be better understood on reading the following description and on examining the appended figures.

DETAILED DESCRIPTION OF THE PREFERRED EMBODIMENTS

Figure 1:
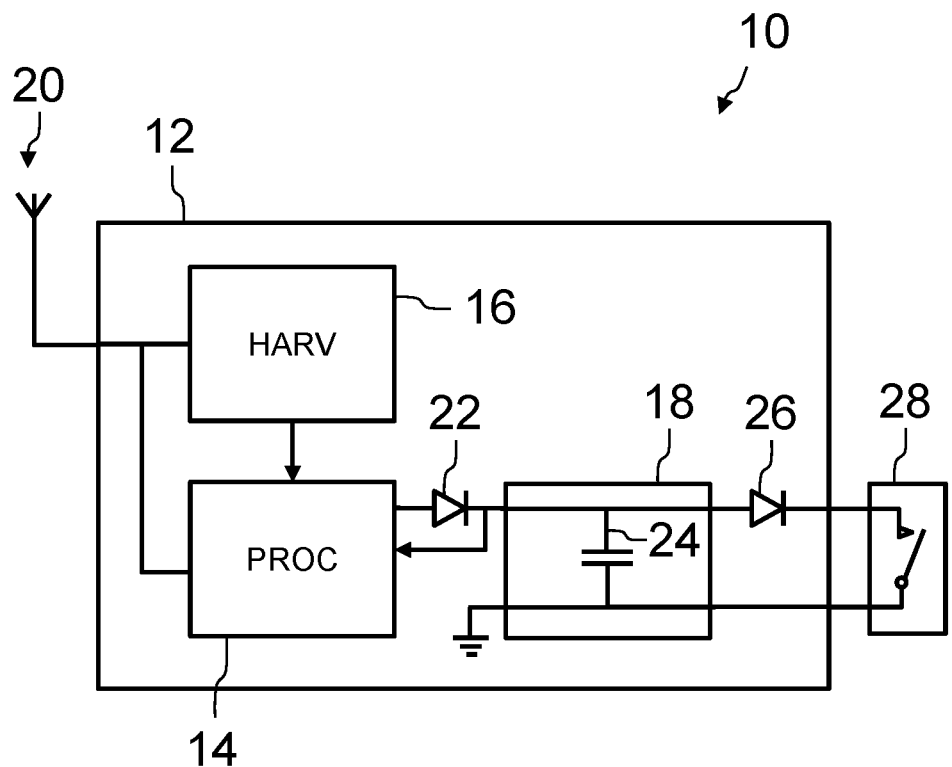
FIG. 1 schematically illustrates a reusable seal according to one embodiment of the invention.

The reusable seal 10, such as shown in FIG. 1, comprises an electronic device 12 coupled to an antenna 20. The electronic device 12 is intended to be connected to an opening sensor 28 for sensing the opening of a volume to be monitored by the seal. The sensor 28 corresponds, for example, to a normally open switch, the contact of which is intended to be closed in the event of the volume being opened. The electronic device 12 comprises an energy-harvesting unit (HARV in the FIG. 16, a processing unit 14 such as a processor or a microprocessor (PROC in the figure) and a memory 18. The energy-harvesting unit 16 is connected both to the antenna 20 and to the processing unit 14. The processing unit 14 is also connected to the antenna. The electronic device 12 is intended to communicate by radiofrequency via the antenna 20. The assembly formed by the electronic device 12 and the antenna 20 is, for example, compatible with RFID (radiofrequency identification) technology. The seal 10 then behaves like a passive RFID transponder or tag.

Figure 2:
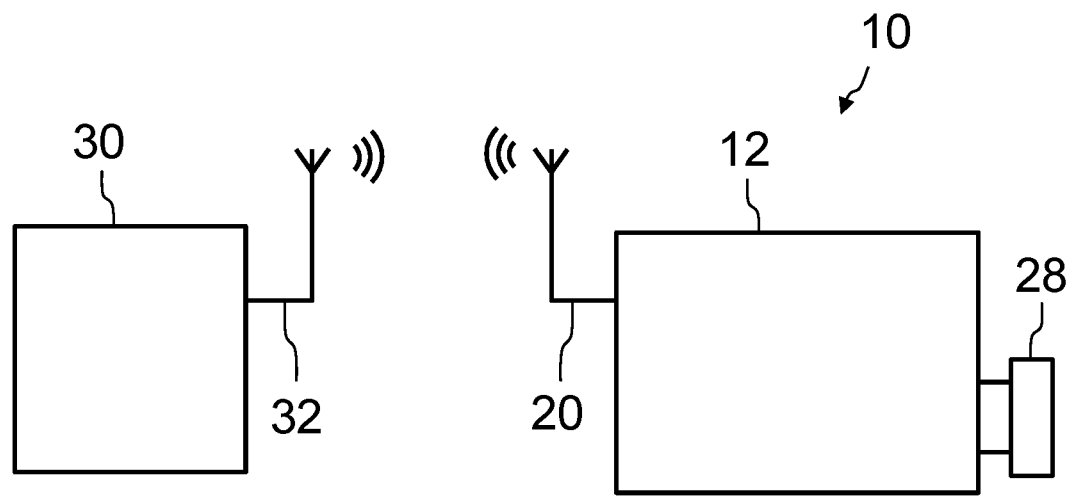
FIG. 2 schematically shows the seal of FIG. 1 in communication with a reader.

FIG. 2 shows a reader 30, for example an RFID reader, provided with an antenna 32 positioned in proximity to the seal 10. In operation, when the reader 30 seeks to communicate with the seal 10, electromagnetic waves are emitted by the antenna 32 of the reader. Some of these waves are received by the antenna 20 of the seal 10 and transmitted to the energy-harvesting unit 16 and to the processing unit 14. The energy-harvesting unit 16 recovers some of the energy from the received electromagnetic waves so as to supply the processing unit 14 with power, like in a typical RFID transponder. Thus, the seal 10 is a passive seal which is supplied with power only by the antenna 20. The seal 10 is supplied with power only when a reader 30 is positioned in proximity to its antenna 20.

When the volume to be monitored is closed, the opening sensor 28 for sensing the opening of the volume to be monitored by the seal is in a state corresponding to an open switch. A user may then set the seal 10 so as to store an intact state of the seal. For this, when the reader 30 is close enough to the seal 10 to allow radiofrequency communication between the reader 30 and the seal 10, the user commands, by means of the reader 30, the storage of the state in the memory of the seal 10. The processing unit 14 receives the storage command from the reader and it commands the charging of the capacitor 24, which corresponds to the active state of the memory 18 and hence to the storage of the intact state of the seal. As long as the memory is in the active state, the electronic device 12 delivers information corresponding to an intact state of the seal in response to a request regarding the state of the seal via a reader such as the reader 30, since the memory 18 is activated.

The opening sensor 28 is connected in parallel to the capacitor 24 corresponding to the memory 18. If the volume to be monitored by the seal is opened, this results in the switch of the sensor 28 being closed. Consequently, the capacitor 24 is discharged through the switch. This discharging of the capacitor 24 may occur at any time, even if the electronic device 12 is not supplied with power. The memory 18 is then in its deactivated state, corresponding to a non-intact state of the seal. Thus, the seal 10 allows an opening of the volume to be monitored to be stored in the memory even if the electronic device 12 is not supplied with power. The electronic device 12 will deliver information corresponding to a non-intact state of the seal in response to a subsequent request regarding the state of the seal via a reader such as the reader 30, since the memory 18 is deactivated. Once the volume to be monitored has been physically checked, it is then closed again and a user may then set the seal 10 again as described above. The seal 10 may thus be reused indefinitely because the detection of the state of the seal is based on whether a capacitor is charged or discharged. It is thus not necessary to replace the seal.

The switch of the opening sensor 28 which is connected in parallel with the capacitor 24 thus forms an electrical circuit in relation to the sensor 28, allowing the capacitor 24 corresponding to the memory 18 to be discharged, i.e., the memory to be deactivated, when the volume to be monitored is opened. As explained above, the electrical circuit allows the memory to be deactivated without requiring the electronic device 12 to be supplied with power and without requiring the electrical circuit to be supplied with power because the circuit is passive and corresponds to a switch connected in parallel to the capacitor corresponding to the memory 18.

Advantageously, the seal 10 comprises a diode 26 that is connected in series on a connection between the memory 18 and the sensor 28. This diode 26 prevents the capacitor 24 from being charged via the connection between the memory 18 and the sensor 28. This makes it possible to prevent a person who has opened the volume to be monitored from being able to reset the seal fraudulently by recharging the capacitor 24 without authorization.

According to a first alternative form (not shown in the figures), the memory 18 is external to the electronic device 12. According to a second alternative form, as shown in FIG. 1, the memory 18 is incorporated within the electronic device 12. This allows the seal 10 to be made secure by making it more difficult for an unauthorized person to access the memory.

Again advantageously, the electronic circuit 12 comprises a diode 22 on a connection between an output of the processing unit 14 and the memory 18. This diode 22 prevents the capacitor 24 from being discharged into the output of the processing unit 14 when the electronic device 12 is not supplied with power. The need for the diode 22 depends on the impedance of the output of the processing unit 14 when the electronic device 12 is not supplied with power.

In one particular embodiment, the capacitor 24 is incorporated within an EEPROM (electrically erasable programmable read-only memory) memory cell.

In one embodiment of the invention, the sensor 28 is associated with a door of the volume to be monitored. According to various examples, this sensor corresponds to:
- a push-button installed between a leaf and a frame of the door such that the button is kept depressed while the door is closed (corresponding to an open position of the switch of the sensor), this button assuming a non-depressed state when the door is at least partially opened (corresponding to a closed position of the switch);
- a magnetic switch (for example a reed switch) associated with a magnet, the magnetic switch being rigidly connected to one of the frame or the leaf of the door and the magnet being rigidly connected to the other of the frame or the leaf of the door.

Other types of sensors or sensor setups are possible without departing from the scope of the invention.

Figure 3:
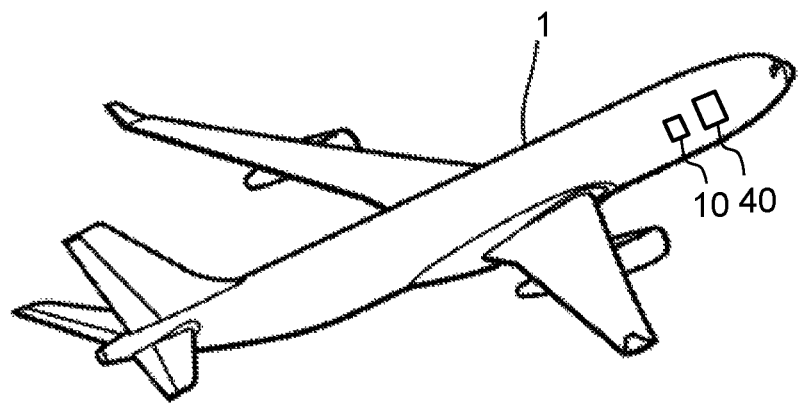
FIG. 3 illustrates an aircraft fitted with a reusable seal.

The invention also relates to a vehicle, for example an aircraft 1 such as shown in FIG. 3, comprising a volume 40 with restricted access, a potential opening of which it is desirable to monitor. A door of the volume with restricted access is fitted with an opening sensor such as the sensor 28 presented above. This opening sensor forms part of a reusable seal such as the seal 10 presented above. The vehicle is also fitted with a radiofrequency reader such as the reader 30 presented above, for communicating with the seal. A user may use the reader to set the memory of the seal to an activated state by sending a suitable command to the seal, which is interpreted by the processing unit 14. The user may also poll the seal for the memory state when it desires so as to ascertain the state of the seal. The seal may be reset as many times as necessary, without requiring physical intervention in the door of the volume to be monitored or in the seal 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A reusable seal comprising:
an antenna;
an opening sensor for sensing an opening of a volume to be monitored by the seal; and
an electronic device that is coupled to the antenna and configured to communicate with a reader via said antenna when the reader is placed in proximity to the antenna,
the electronic device being connected to the sensor, and
the electronic device being supplied with power only by the antenna when a reader is placed in proximity to the antenna,
the seal comprising a memory that comprises an active state or an inactive state, wherein the active state corresponds to the seal being in an intact state, and the inactive state corresponds to the seal being in a non-intact state,
the seal being configured such that:
the memory is activated only by the electronic device when said device is supplied with power by the reader and receives a memory activation command from said reader so as to store the intact state of the seal in the memory; and
the memory is deactivated at any time when the sensor is actuated, without requiring the electronic device to be supplied with power, so as to store the non-intact state of the seal in the memory, and
the electronic device being configured to respond to a request from the reader regarding the state of the seal by providing information corresponding to the intact state of the seal when the memory is activated and by providing information corresponding to the non-intact state of the seal when the memory is deactivated,
wherein the memory comprises a capacitor that comprises a charged state or a discharged state such that a charged state of the capacitor corresponds to an activated state of the memory and a discharged state of the capacitor corresponds to a deactivated state of the memory.

2. The seal according to claim 1, further being configured such that the deactivation of the memory when the volume to be monitored is opened is performed by an action of an electrical circuit in relation to the sensor without requiring the electronic device to be supplied with power or said electrical circuit to be supplied with power.

3. The seal according to claim 1, wherein the antenna and the electronic device form part of an RFID device.

4. The seal according to claim 1, wherein the memory is incorporated within the electronic device.

5. The seal according to claim 4, wherein the capacitor is incorporated within an EEPROM cell of the electronic device.

6. A vehicle comprising:
a reusable seal according to claim 1; and
a reader for communicating with said seal,
the opening sensor being arranged so as to allow a volume of the vehicle with restricted access to be monitored.

7. A reusable seal comprising:
an antenna;
an opening sensor for sensing an opening of a volume to be monitored by the seal; and
an electronic device that is coupled to the antenna and configured to communicate with a reader via said antenna when the reader is placed in proximity to the antenna,
the electronic device being connected to the sensor, and
the electronic device being supplied with power only by the antenna when a reader is placed in proximity to the antenna,
the seal comprising a memory that comprises an active state or an inactive state,
the seal being configured such that:
the memory is activated only by the electronic device when said device is supplied with power by the reader and receives a memory activation command from said reader so as to store an intact state of the seal in the memory; and
the memory is deactivated at any time when the sensor is actuated, without requiring the electronic device to be supplied with power, so as to store a non-intact state of the seal in the memory, and the electronic device being configured to respond to a request from the reader regarding the state of the seal by providing information corresponding to an intact state of the seal when the memory is activated and by providing information corresponding to a non-intact state of the seal when the memory is deactivated, wherein the memory comprises a capacitor that comprises a charged state or a discharged state such that a charged state of the capacitor corresponds to an activated state of the memory and a discharged state of the capacitor corresponds to a deactivated state of the memory, and wherein the seal comprises a diode on a connection between the capacitor and the sensor so as to prevent the capacitor from being charged via said connection.

8. A reusable seal comprising:

an antenna;

an opening sensor for sensing an opening of a volume to be monitored by the seal; and an electronic device that is coupled to the antenna and configured to communicate with a reader via said antenna when the reader is placed in proximity to the antenna, the electronic device being connected to the sensor, and the electronic device being supplied with power only by the antenna when a reader is placed in proximity to the antenna, the seal comprising a memory that comprises an active state or an inactive state, the seal being configured such that:

the memory is activated only by the electronic device when said device is supplied with power by the reader and receives a memory activation command from said reader so as to store an intact state of the seal in the memory; and the memory is deactivated at any time when the sensor is actuated, without requiring the electronic device to be supplied with power, so as to store a non-intact state of the seal in the memory, and the electronic device being configured to respond to a request from the reader regarding the state of the seal by providing information corresponding to an intact state of the seal when the memory is activated and by providing information corresponding to a non-intact state of the seal when the memory is deactivated, wherein the memory comprises a capacitor that comprises a charged state or a discharged state such that a charged state of the capacitor corresponds to an activated state of the memory and a discharged state of the capacitor corresponds to a deactivated state of the memory, and wherein the memory is external to the electronic device.

* * * * *